United States Patent [19]

Lynnes

[11] Patent Number: 5,078,568
[45] Date of Patent: Jan. 7, 1992

[54] SPACER FOR LIFT ARM CROSS MEMBER ON SKID STEER LOADER

[75] Inventor: Carman P. Lynnes, Leonard, N. Dak.

[73] Assignee: Clark Equipment Company, South Bend, Ind.

[21] Appl. No.: 610,858

[22] Filed: Nov. 7, 1990

[51] Int. Cl.⁵ .............................................. E02F 9/00
[52] U.S. Cl. .................................. 414/680; 414/685; 414/697
[58] Field of Search ................. 280/163; 293/102, 120; 414/685, 697, 719, 722, 680

[56] References Cited

U.S. PATENT DOCUMENTS

| | | | |
|---|---|---|---|
| 3,322,916 | 5/1967 | Fisher | 293/120 X |
| 3,608,882 | 9/1971 | Culp | 293/120 X |
| 3,800,969 | 4/1974 | Steiger | 414/697 X |
| 4,055,262 | 10/1977 | Bauer et al. | 414/697 |
| 4,122,960 | 10/1978 | Baver et al. | 414/697 |
| 4,903,418 | 2/1990 | Loudon | 414/685 X |

FOREIGN PATENT DOCUMENTS 447940  3/1968  Switzerland .......................... 414/697

Primary Examiner—Frank E. Werner
Assistant Examiner—James Eller
Attorney, Agent, or Firm—Kinney & Lange

[57] ABSTRACT

A skid steer loader has a main frame and a pair of lift arms pivotally mounted to the main frame. The lift arms extend forwardly from their pivots and are joined by a cross member which is positioned ahead of a front wall of the main frame and which serves as an operator's access step. The cross member is constructed to be reduced in size to increase visibility, and when reduced in size, it remains spaced from the front wall of the main frame to form a gap when the lift arms are lowered. A flexible, self-cleaning spacer member is mounted onto the front wall of the main frame and extends at least partially across the gap to serve as an additional support if an operator's foot is placed in the gap. The spacer member is flexible when loaded in fore and aft direction and is rigid in vertical loading direction to support loads which may be applied to its upper edge.

6 Claims, 4 Drawing Sheets

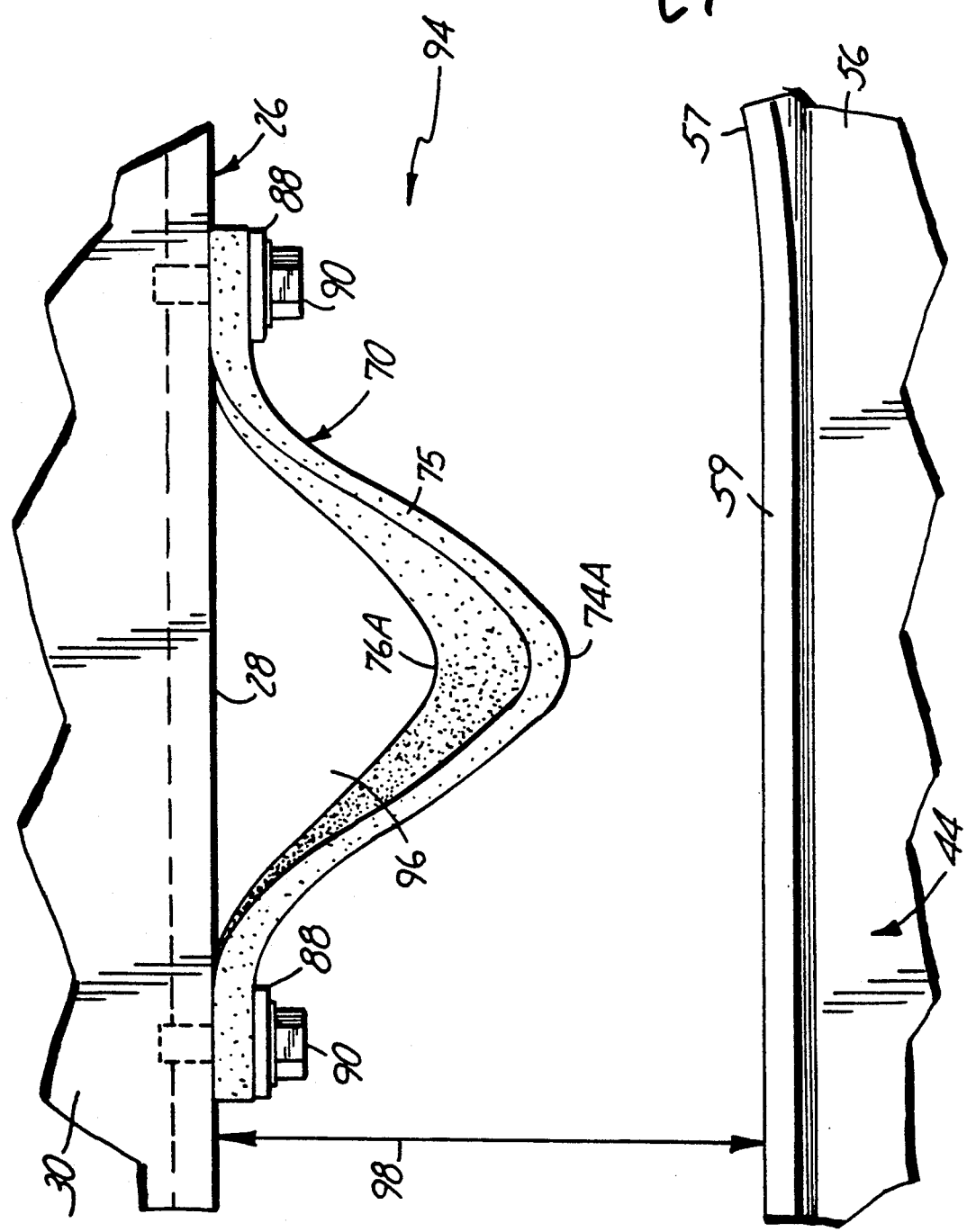

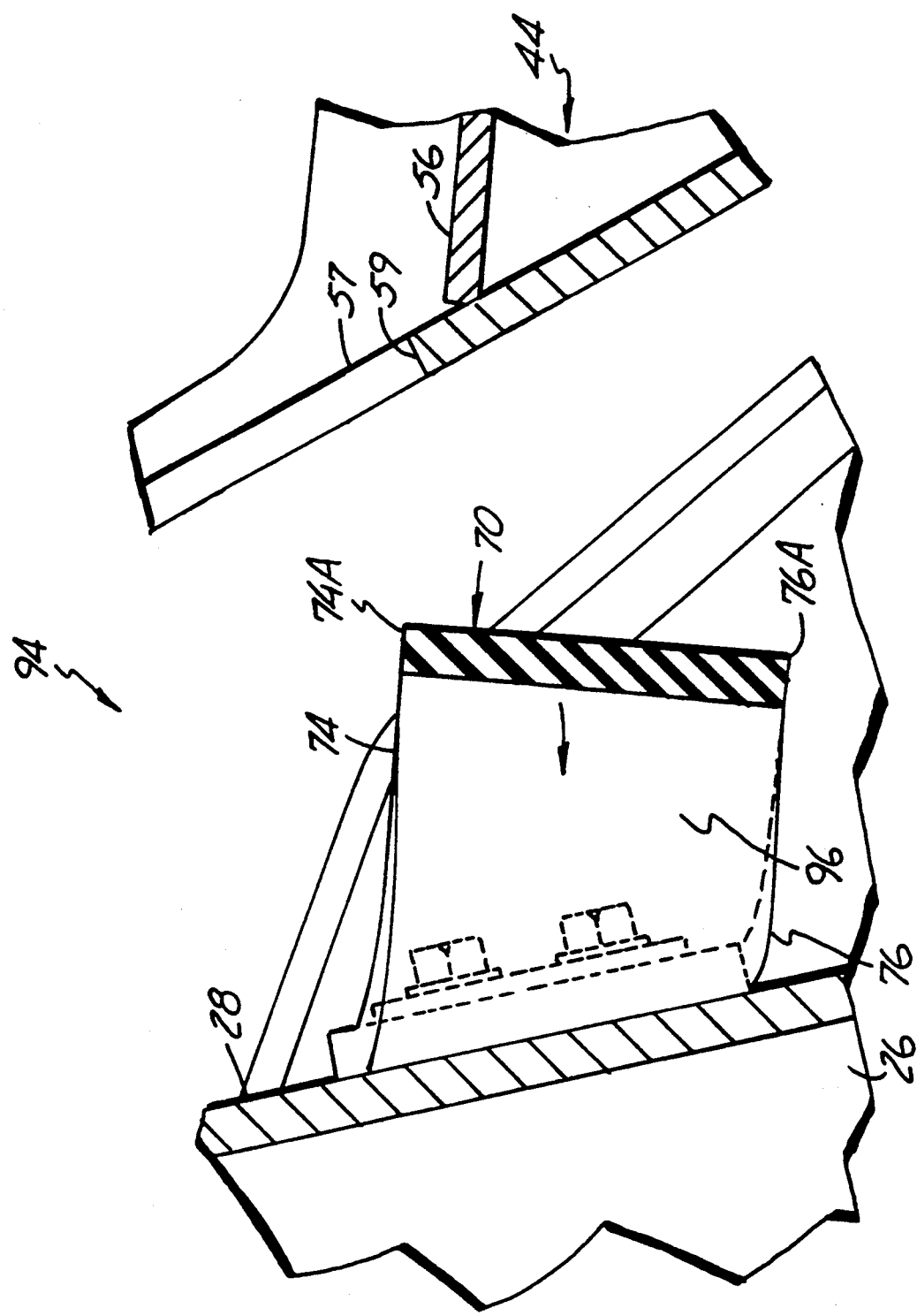

SPACER FOR LIFT ARM CROSS MEMBER ON SKID STEER LOADER

BACKGROUND OF THE INVENTION

1. Field of the Invention

The present invention relates to a flexible weight supporting spacer between the front wall of the main frame of a skid steer loader and a front lift arm cross member, to serve as an additional support member when the thickness of the front cross member is reduced sufficiently so a gap is formed.

2. Description of the Prior Art

Skid steer loaders such as that shown in U.S. Pat. No. 4,055,262, are highly maneuverable self-propelled loaders which have lift arms that can be used to raise and lower loads at the front of the loaders. The loaders have operator compartments accessible from the front. The lift arms are pivoted at the rear of a main frame of the loader and extend forwardly along the sides of the operator compartment. A front cross member joins the lift arms immediately in front of the operator's compartment. The cross member is adjacent, but spaced from, a front wall of the loader main frame when the lift arms are in a lowered position. The cross member serves as an operator's step to reach the operator compartment. The cross member has to be rigid enough to serve the purpose of holding the lift arms together and to support a center mounted tilt cylinder bracket, which in turn extends rearwardly to support an end of an actuator for tilting a front mounted bucket. The tilt cylinder bracket has to clear the front wall member of the main frame. The cross member between the arms thus has been made wide (in fore and aft direction), primarily to close a gap between the frame front wall member and the cross member while serving as a step for an operator to enter the operator compartment. Reducing the size of the front cross member helps visibility of the load when the lift arms are raised during operation, and thus is desired. A narrower lift arm cross member reduces the amount of material accumulation on the cross member, but also causes a gap between the front frame wall and the cross member.

Thus the two "needs" for the lift arm cross member present conflicting demands, namely keeping the cross member small for visibility improvement and reducing accumulation of material on the cross member, while on the other hand keeping the top wall of the cross member wide for good operator footing. The spacer of the present invention helps to accommodate both needs.

SUMMARY OF THE INVENTION

The present invention relates to a spacer mounted to a front wall of a main frame of a skid steer loader, and extending toward a front cross member of a pair of loader lift arms on which operators will step when entering an operator compartment of the loader. The front cross member of the lift arms is positioned ahead of the front wall of the main frame when the arms are lowered. The cross member is of substantial vertical height for rigidity and supports a center bracket for holding a tilt cylinder used for tilting a bucket or other tool mounted on the lift arms. The spacers of the present invention span a major portion of any gap between the lift arm cross member so the front cross member can be relatively narrow in fore and aft directions for improving visibility of a lifted load when the lift arms are in the raised position and reducing material accumulation.

The spacers are made of a flexible strip of material bent into a "U" shape and attached to the frame front wall. The spacers terminate closely adjacent the rear of the front cross member for the lift arms. The spacers serve as additional supports if the gap between front frame wall and the cross member is large and an operator steps partially across or into the gap. The spacers can abut the rear side of the cross member without damage because the spacers will compress a substantial amount toward the frame front wall.

The preferred generally shallow U-shape with an open center permits material to drop through the spacer if some material is spilled over the loader bucket.

The spacers are easily made from a strip of elastomeric or rubber material which can be reinforced if desired, and will provide adequate strength and resilience to function as a spacer and step that will support vertical load and substantially span any gap between the front frame wall and the lift arm cross member.

BRIEF DESCRIPTION OF THE DRAWINGS

FIG. 4 is a fragmentary top plan view showing a spacer attached to the front wall and positioned adjacent a front cross member for the lift arms of such skid steer loader;

FIG. 6 is a fragmentary vertical sectional view of a spacer made according to the present invention.

DETAILED DESCRIPTION OF THE PREFERRED EMBODIMENTS

Figure 1:
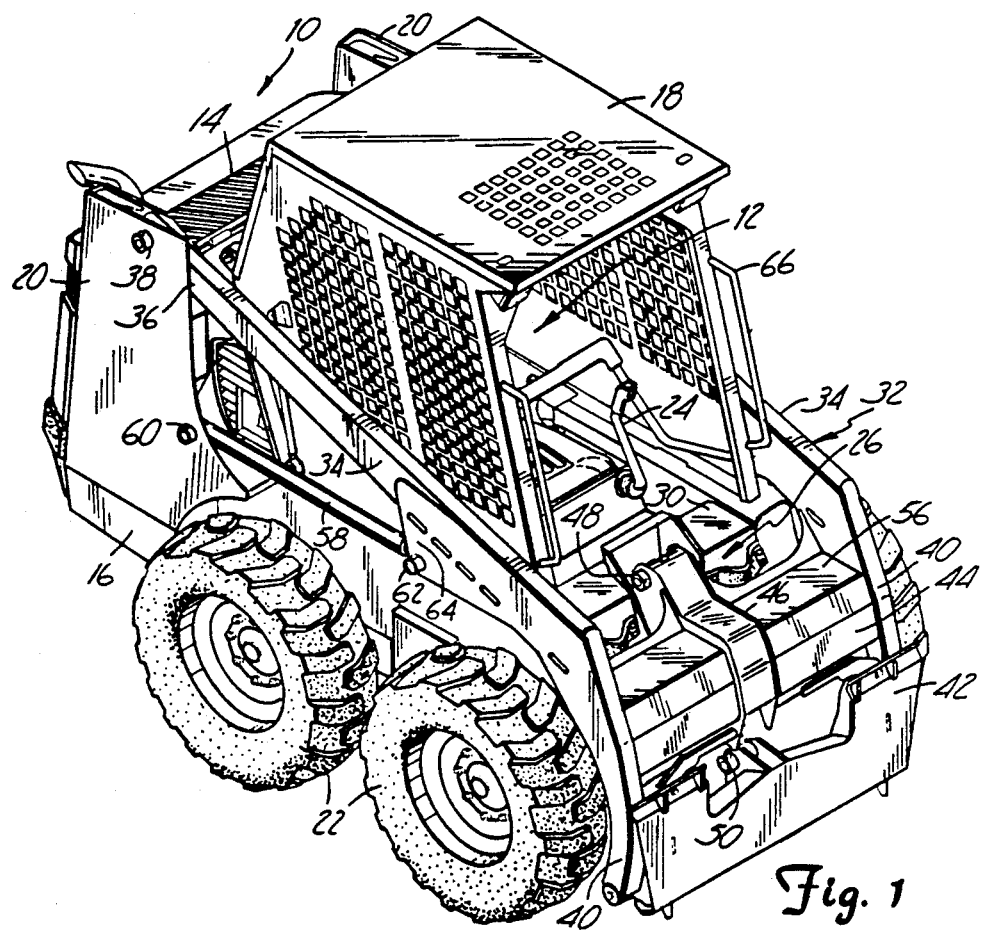
FIG. 1 is a perspective view of a skid steer loader having spacers attached to a front wall of a main loader frame in accordance with the present invention.
Figure 2:
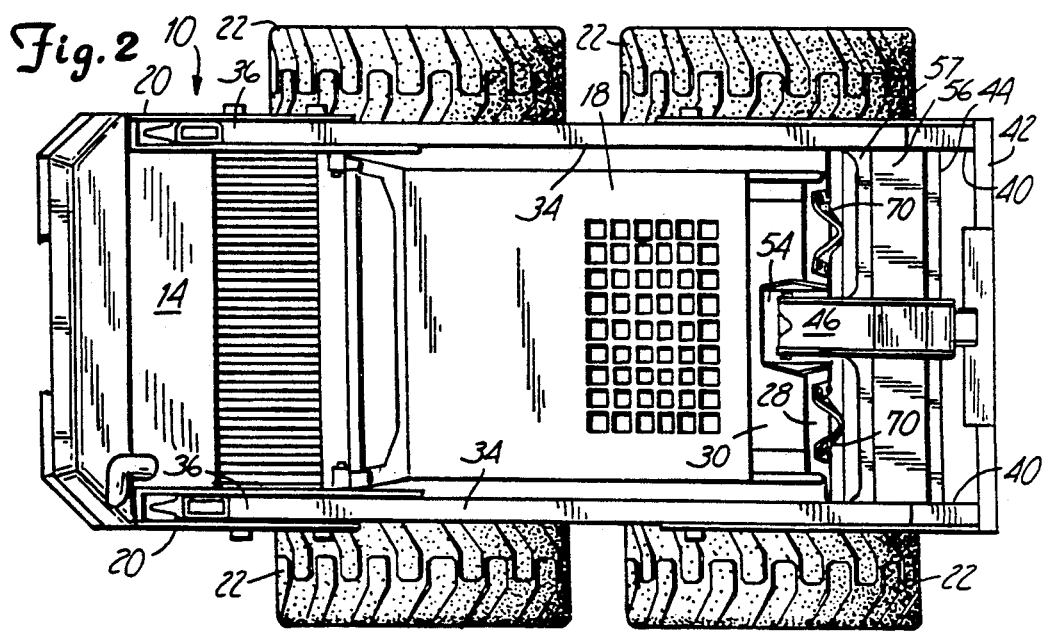
FIG. 2 is a top plan view of the skid steer loader of FIG. 1.

A rigid frame skid steer loader 10 includes a main frame 16 which supports a protected operator's compartment 12 with an engine compartment 14 at the rear. A cab structure 18 overlies the operator compartment 12. Upright rear support members 20,20 are located at the rear of the main frame 16 and are used to support a loader lift arm assembly 32. Power from engine 14 is transmitted to the front and rear drive wheels 22, which are controlled conventionally through operator levers 24.

The main frame 16 includes a front member 26. The front frame member 26 has a generally upright, planar front wall 28. The front frame member 26 also has a top wall 30.

Lift arm assembly 32 has individual first and second lift arms 34 with rear ends 36 which are pivotally mounted on suitable pivot pins 38 to the upper ends of upright support members 20,20. The lift arms 34 have forward end portions 40 which extend downwardly at the front of the loader. The outer ends of the forward lift arm portions 40 pivotally mount a suitable attachment member indicated generally at 42, which is shown only schematically. The member 42 is used for mounting a bucket or tool onto the lift arms.

The forward portions 40 of the lift arms 34 are joined together with a front lift arm cross member 44. The lift arm cross member 44 has a center section that support a tilt cylinder bracket 46. A hydraulic tilt cylinder is pivotally mounted on a pin 48 at a rear upper portion of bracket 46. The tilt cylinder has an extensible and retractable rod end connected with a pin 50 to the bracket 46. The front frame cross member 26 and front wall 28 are recessed in the center as shown at 54 to provide some clearance for the rear portions of the tilt cylinder bracket 46 when the lift arms 34 are in the lowered position as shown in FIG. 1. The clearance needed for the tilt cylinder bracket and lift arms results in the lift arm cross member being spaced from the front wall 28 when the lift arm cross member is reduced in size for better visibility.

The lift arm cross member 44 has an upper wall 56 which forms a generally horizontal surface when the lift arms 34 are in their lowered position. A rear relatively short flange section 57 of a rear wall is provided at the rear of the lift arm cross member 44. The flange section 57 has a top edge with rounded corners that form fillets at the junctions with the tilt cylinder bracket 46 and the respective lift arms 34. The cross member 44 and wall 56 of flange section 57 hold the lift arms 34 in a rigid assembly and also provides a brace for the tilt cylinder bracket 46. The lift arm assembly 32 can be raised and lowered relative to the main frame 16 through the operation of lift cylinders or actuators 58, which have first ends mounted on suitable pivot pins 60 to the upright members 20 at locations spaced downwardly from pins 38. The rod ends of cylinders or actuators 58 are mounted with pins 62 to suitable brackets 64 attached to the respective lift arms 34.

As can be seen, when lift arms 34 are in their lowered positions shown in FIG. 1, the upper wall 56 of the lift arm cross member 44 on each side of the tilt cylinder bracket 46 serves as an operator's step section for entry into the front access opening of the operator's compartment 12. The operator steps on the cross member 44 and moves between the lift arms. Handle grips 66 are provided along the opposite sides of the operator compartment walls for the operator.

The upper wall 56 has two step portions, one on each side of tilt cylinder bracket 46. Top wall 30 of the frame front cross member provides an additional stepping surface for entry to the operator's compartment of the loader.

When upper wall 56 of lift arm cross member 44 is constructed of a minimum fore and aft width to improve visibility when loader arms 34 are in their raised position, the rear edges of upper wall 56 and flange section 57 are spaced from the front wall 28 of the main frame with the lift arms lowered, due in part to the clearance needed for tilt cylinder bracket 46. Thus with a desired narrow lift arm cross member there is a space or gap on each of the opposite sides of tilt cylinder bracket 46, in which identical spacer assemblies 70 are positioned to extend substantially between the front wall 28 of the main frame, and the lift arm cross member 44. The spacer assemblies 70 have top edges lying substantially along the plane of upper wall 56 and adjacent the level of the top edge 59 of the center portion of the flange section 57 and serve as additional support members for supporting an operator entering the operator compartment if the operator steps partially or completely into the gap.

The spacers 70 are identically constructed, and each spacer is made of a strip 72 of belting material, such as a masticated rubber belting. The belting strips 72 are relatively thick, but flexible enough to be bent, and are cut in a trapezoidal shape. That is, the belting has parallel top and bottom edges 74 and 76 with tapered side edges 78 and 80 (see FIG. 5).

Figure 3:
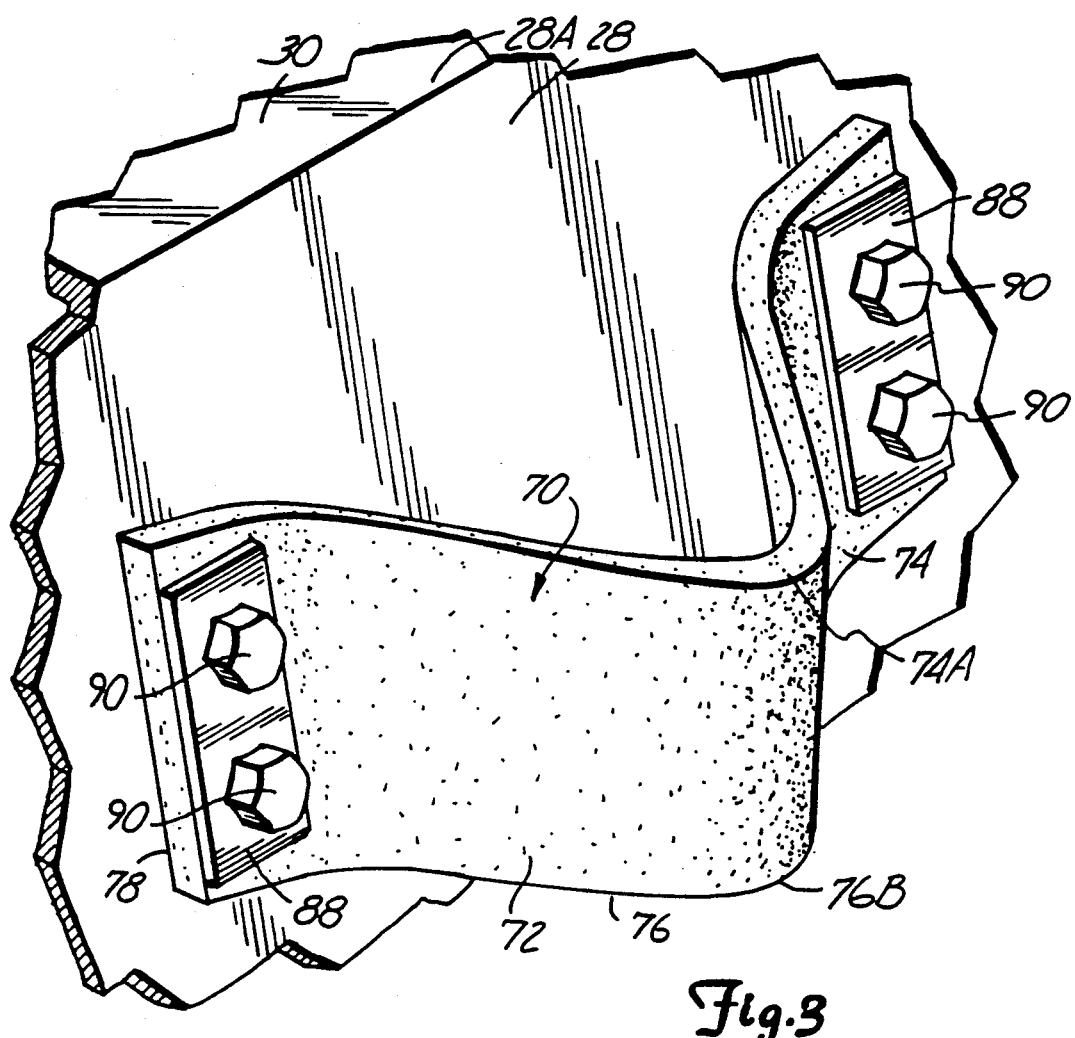
FIG. 3 is a perspective view of the spacer made according to the present invention when installed on the front wall of the main frame of a skid steer loader.
Figure 5:
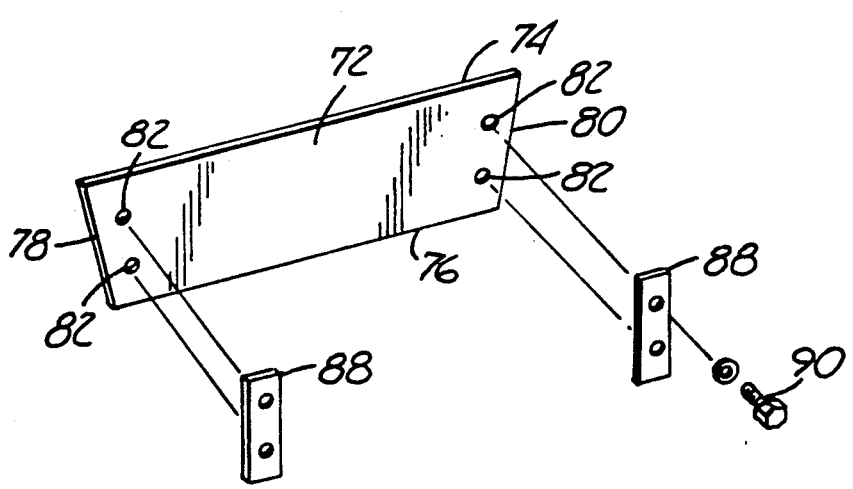
FIG. 5 is an exploded perspective view of a spacer made according to the present invention shown in flat layout, with fasteners positioned adjacent thereto.

The belting strips 72 have two apertures 82 along each of the side edges. The two apertures along each edge have axes which lie on a plane parallel to the respective edge 78 or 80. It can thus be seen that the planes passing through the axes of apertures 82 on the respective sides of the strip 72 are not perpendicular to the edges 74 and 76. When mounted onto the front wall 28 of the main frame of the loader 10, each pair of apertures 82 is aligned with a pair of apertures in the front wall 28 which have axes lying on a plane perpendicular to the top edge 28A (see FIG. 3) of front wall 28 of the main frame. Further, the pairs of apertures on front wall 28 are spaced closer together laterally (side-to-side) than the pairs of aperture 82 of the belting strip 72 as shown in FIG. 5 in flat layout. The belting strips are thus formed into a generally shallow or V or U-shaped configuration when installed. The angle of the planes of the axes of the two pairs of apertures 82 on the belting strips 72 forces the upper edge surface 74 of the belting strip outwardly from the front wall 28 a greater distance than the lower edge 76 of the belting strip. Each belting strip 72 is clamped against front wall 28 of the main frame utilizing strip washers 88 and suitable cap screws 90.

Each spacer 70 is thus securely held in position. Points 74A and 76A are spaced from wall 28 to provide a vertical opening through the spacer in the center portions to permit debris to drop through without plugging up. Edge surface 74 is generally on a horizontal plane and the spacer is rigid enough to support weight. The spacer is flexible enough to compress or yield toward wall 28 if bumped or engaged by an obstruction.

FIGS. 4 and 6 illustrate front cross member 44, upper wall 56 and flange section 57 with respect to front wall 28 of the main frame 16, to show the gap indicated generally at 94. Spacer 70, comprising belting strip 72, is shown in a top view, which illustrates that point 74A of upper edge 74 is spaced outwardly from front wall 28 a greater distance than point 76A of lower edge 76 of the strip. FIG. 4 also shows opening 96 through which material can fall if it drops into gap 94. The upper edge surface 74 of the spacer supports the weight of an operator who may step into gap 94.

The spacing of the gap 94 indicated by double arrow 98 is greater than the outward extension of point 74A from front wall 28. The extension of each spacer 70 from the front wall 28 is preferably greater than one-half the length of the gap 94 to fulfill its function as an additional support member.

It should be noted that upper edge surface 74 of each spacer 70 should be approximately on the same plane as top edge 59 of the corresponding flange section 57 when the lift arms are in the lowered position (see FIG. 6). This is below the upper wall 30 of the front cross member 26 of the main frame. The upper edge surface 74 is thus at a level to support a portion of an operator's foot which may also be partially supported on the lift arm cross member 44.

Although the present invention has been described with reference to preferred embodiments, workers skilled in the art will recognize that changes may be made in form and detail without departing from the spirit and scope of the invention.

What is claimed is:

1. A skid steer loader comprising:
a main frame having a front wall member;
a pair of lift arms pivotally mounted at first ends to the main frame for movement between raised and lowered positions;
a lift arm cross member extending between the lift arms at second ends of the lift arms and spaced from the front wall member of the main frame by a gap when the lift arms are in their lowered position; and
a spacer member mounted to the main frame front wall member and extending into the gap between the front wall member and the cross member when the lift arms are in their lowered position, the spacer member comprising a strip of flexible elastomeric material having opposite ends forming a length with a center portion therebetween, and two sides edges forming a width, the strip being formed into a U-shape, when installed, with the center portion of the strip protruding outwardly from the front wall member, and with the two side edges forming upper and lower surfaces, respectively, said upper surface defining an upper support surface adjacent the cross member when the lift arms are in said lowered position.

2. The loader of claim 1 including two spacer members, each mounted to the front wall member of the main frame between a longitudinal center line of the main frame and a side of the main frame.

3. The loader of claim 1 wherein the cross member has a pair of opposite ends fixedly mounted to the lift arms.

4. The loader of claim 1 wherein the spacer member and gap have fore and aft lengths, and the length of the spacer member is greater than one-half the length of the gap.

5. The loader of claim 1 wherein the cross member has a top wall forming an entry step for an operator of the loader, the spacer member upper surface forming the upper support surface substantially at a level with the cross member top wall.

6. The loader of claim 1 further comprises aperture means adjacent each end of the strip comprising at least two apertures at each end which have axes lying on a line at an acute angle to the strip side edges, the second aligning aperture means being arranged so when installed on a front wall member the center portion of the strip top edges protrudes a greater distance from the front wall member than the bottom edge.

* * * * *

UNITED STATES PATENT AND TRADEMARK OFFICE
CERTIFICATE OF CORRECTION

PATENT NO. : 5,078,568
DATED : January 7, 1992
INVENTOR(S) : Carman P. Lynnes

It is certified that error appears in the above-identified patent and that said Letters Patent is hereby corrected as shown below:

Col. 6, line 19, delete "comprises" and insert --comprising--.

Signed and Sealed this

Sixth Day of April, 1993

Attest:

STEPHEN G. KUNIN

*Attesting Officer*   Acting Commissioner of Patents and Trademarks